United States Patent
Baxter et al.

(10) Patent No.: US 10,160,324 B2
(45) Date of Patent: Dec. 25, 2018

(54) AUTOMATICALLY SENSING A TYPE OF CHARGING CABLE AND SETTING MAXIMUM AMPERAGE OUTPUT OF AN ELECTRIC VEHICLE CHARGING STATION ACCORDINGLY

(71) Applicant: ChargePoint, Inc., Campbell, CA (US)

(72) Inventors: David Baxter, Monte Sereno, CA (US); Carl F. Hagenmaier, Los Altos, CA (US); Darren Chin-Ho Kim, Oakland, CA (US); Price B. Terzis, Los Altos Hills, CA (US); Charles R. Geber, San Jose, CA (US); Craig T. Matsuno, San Jose, CA (US)

(73) Assignee: CHARGEPOINT, INC., Campbell, CA (US)

( * ) Notice: Subject to any disclaimer, the term of this patent is extended or adjusted under 35 U.S.C. 154(b) by 129 days.

(21) Appl. No.: 14/984,487

(22) Filed: Dec. 30, 2015

(65) Prior Publication Data

US 2016/0185244 A1 Jun. 30, 2016

Related U.S. Application Data

(60) Provisional application No. 62/099,015, filed on Dec. 31, 2014.

(51) Int. Cl.
*H02J 7/00* (2006.01)
*B60L 3/00* (2006.01)
(Continued)

(52) U.S. Cl.
CPC .............. *B60L 3/0023* (2013.01); *B60L 3/04* (2013.01); *B60L 11/1818* (2013.01); *B60L 11/1824* (2013.01); *B60L 11/1846* (2013.01); *B60L 2210/30* (2013.01); *B60L 2230/12* (2013.01); *B60L 2230/16* (2013.01); *B60L 2240/547* (2013.01); *B60L 2240/549* (2013.01); *Y02T 10/7005* (2013.01); *Y02T 10/7088* (2013.01); *Y02T 10/7241* (2013.01);
(Continued)

(58) Field of Classification Search
CPC ......... B60L 3/0023; Y02T 90/14; Y02T 90/12
USPC ........................................................ 320/109
See application file for complete search history.

(56) References Cited

U.S. PATENT DOCUMENTS

| 5,413,493 A | * | 5/1995 | Hoffman | ............. B60L 11/1818 200/51.09 |
| 2003/0196829 A1 | | 10/2003 | Booth et al. | |

(Continued)

FOREIGN PATENT DOCUMENTS

WO 2014006306 A1 1/2014

OTHER PUBLICATIONS

International Search Report and Written Opinion for Application No. PCT/US2015/068256, dated May 13, 2016, 12 pages.

*Primary Examiner* — Richard Isla
*Assistant Examiner* — Johali Torres Ruiz
(74) *Attorney, Agent, or Firm* — Nicholson De Vos Webster & Elliott LLP

(57) ABSTRACT

An electric vehicle charging station detects a property of a charging cable connected to the electric vehicle charging station and determines, based on the detected property, an ampere capacity of the charging cable. The electric vehicle charging station automatically sets a maximum amperage output of the electric vehicle charging station to not exceed the determined ampere capacity of the charging cable.

13 Claims, 6 Drawing Sheets

(51) Int. Cl.
*B60L 3/04* (2006.01)
*B60L 11/18* (2006.01)

(52) U.S. Cl.
CPC .......... *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(56) References Cited

U.S. PATENT DOCUMENTS

| | | |
|---|---|---|
| 2009/0022067 A1 | 1/2009 | Gotwals |
| 2012/0119702 A1* | 5/2012 | Gaul .................... B60L 3/0069 320/109 |
| 2013/0057389 A1* | 3/2013 | Balgard ............... G07B 15/063 340/10.1 |
| 2013/0175990 A1* | 7/2013 | Jung .................... B60L 11/126 320/109 |
| 2013/0187600 A1 | 7/2013 | Gale et al. |
| 2014/0120764 A1* | 5/2014 | Valadas ................ G02B 6/3817 439/488 |
| 2016/0107530 A1* | 4/2016 | Roberts ............... B60L 11/1818 320/109 |

* cited by examiner

AUTOMATICALLY SENSING A TYPE OF CHARGING CABLE AND SETTING MAXIMUM AMPERAGE OUTPUT OF AN ELECTRIC VEHICLE CHARGING STATION ACCORDINGLY

CROSS-REFERENCE TO RELATED APPLICATIONS

This application claims the benefit of U.S. Provisional Application No. 62/099,015 filed Dec. 31, 2014, which is hereby incorporated by reference.

FIELD

Embodiments of the invention relate to the field of charging electric vehicles; and more specifically, to automatically sensing a type of charging cable that connects an electric vehicle to an electric vehicle charging station and setting the maximum amperage output of the electric vehicle charging station accordingly.

BACKGROUND

Electric vehicle charging stations (sometimes referred herein as "charging stations") are used for charging electric vehicles (e.g., electric battery powered vehicles, gasoline/electric battery powered vehicle hybrid, etc.). Charging stations may be located in designated charging locations (e.g., similar to locations of gas stations), parking spaces (e.g., public parking spaces and/or private parking space), at residences, etc. A user typically plugs a charging cable connected to a charging station into their electric vehicle for charging.

Charging stations can be designed to support different current levels and charging cables (the cables that connect the electric vehicle with a port of the station) can be rated at different current levels. For example, some charging cables may be rated at 16 Amps while other charging cables may be rated at 32 Amps. Hazardous conditions and equipment damage/failure may occur if the ampere capacity (ampacity) of a charging cable is exceeded (e.g., a charging cable rated at 16 Amps is used to carry 32 Amps).

Some charging stations have been designed with a physical switch, jumper, or rotary dial that allows a user or installer to set the maximum current that can be supplied by the station. This allows the user/installer to set the maximum amperage output to not exceed the ampacity of the expected charging cable to be used. However, these physical switches, jumpers, or dials are typically not easily accessible. Also if a user changes their charging cable or a different user brings a different charging cable to use, the user will need to remember to check and possibly change the amperage setting of the station. Some charging stations are designed to infer the current capacity of the cable through coding resistors. However this requires extra pins to be included on the charging station to be able to infer the current capacity of the cable.

SUMMARY

An electric vehicle charging station detects a property of a charging cable connected to the electric vehicle charging station and determines, based on the detected property, an ampere capacity of the charging cable. The electric vehicle charging station automatically sets a maximum amperage output of the electric vehicle charging station to not exceed the determined ampere capacity of the charging cable. In one embodiment, the charging station detects whether a magnet is included in the charging cable where the ampere capacity of the charging cable is determined based on whether a magnet is detected in the charging cable. In one embodiment, setting the maximum amperage output of the electric vehicle charging station to not exceed the determined ampere capacity of the charging cable includes the charging station signaling a maximum available continuous current capacity that does not exceed the determined ampere capacity of the charging cable to an electric vehicle connected to the electric vehicle charging station via the charging cable.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
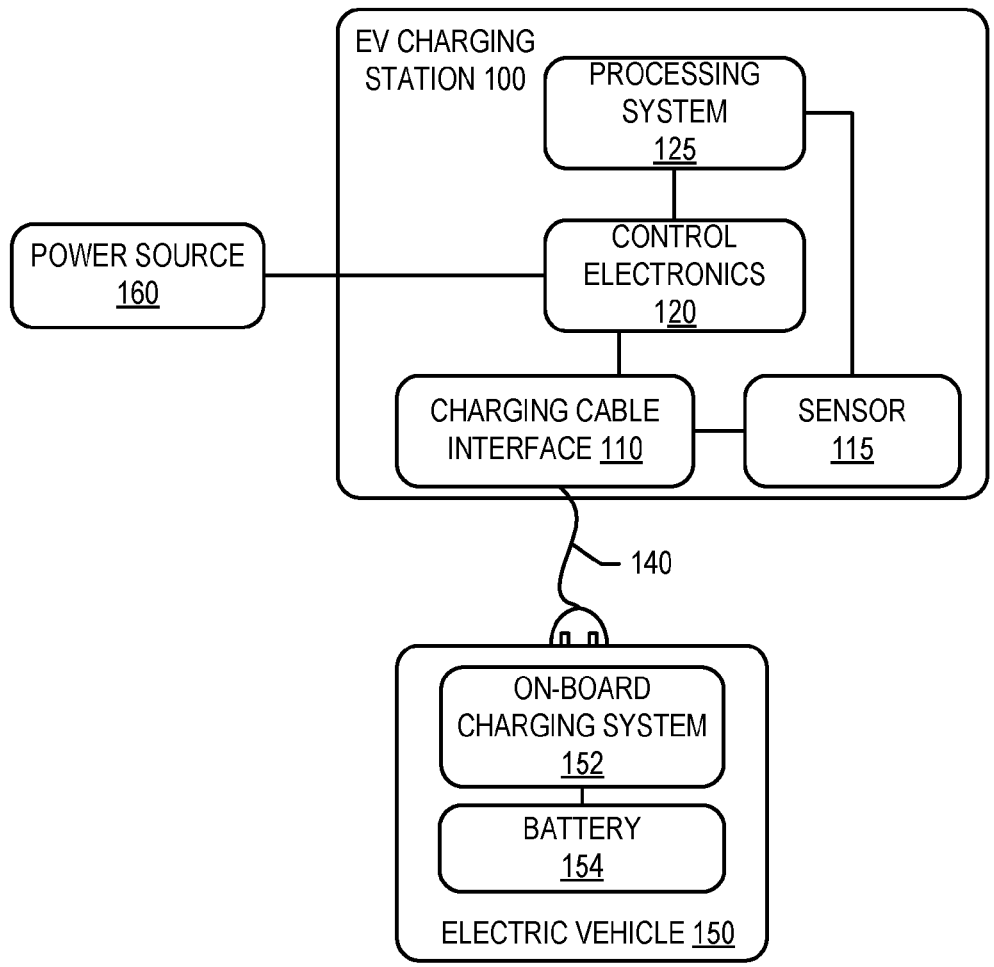
FIG. 1 is a block diagram that illustrates components of an exemplary electric vehicle charging station that is configured to automatically sense a type of charging cable connected to an electric vehicle charging station and set its maximum amperage output according to the sensed charging cable type according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

A method and apparatus for automatically sensing a type of charging cable connected to an electric vehicle charging station and configuring the charging station according to the sensed charging cable type is described. In one embodiment of the invention, the charging station determines the type of charging cable that is connected based on an observable physical property of the charging cable. In a specific embodiment, the charging station supports two types of charging cables (e.g., one rated at 16 Amps and another rated at 32 Amps) and determines which of the two charging cables is connected based on an observable physical property of the charging cable. For example, the charging station may include a sensor (e.g., a hall effect sensor, a mercury switch) to detect the presence of a magnet that is designed to be included in only one of the two types of charging cable (the magnet would not be included in the other type of charging cable). As another example, the charging station may include an optical sensor that would detect the presence of, or absence, of light, where one of the two types of charging cable is designed to interrupt the light whereas the other is not. In other embodiments, the charging station may include a sensor to detect an RFID tag that identifies the type of charging cable. In other embodiments, the charging station may include a sensor to read an identification code from the charging cable such as a barcode that identifies the type of charging cable.

After determining the type of charging cable that is connected, the charging station automatically configures one or more charging parameters based on the determined charging cable type. For example, the charging station may automatically set its maximum amperage output to not exceed the rating of the determined charging cable type. The charging station may signal the maximum available continuous current capacity to the electric vehicle. For instance, assuming that the charging station determined that a charging cable that is rated at 16 Amps is connected, the charging station may automatically set the maximum amperage output to not exceed 16 Amps and source a signal (e.g., a control pilot signal) to signal the maximum available continuous current capacity to not exceed 16 Amps to an electric vehicle. If the electric vehicle does not limit their current draw to the signaled maximum available continuous current capacity, the charging station may be configured to stop and/or prevent charging.

FIG. 1 is a block diagram that illustrates components of an exemplary electric vehicle charging station 100 that is configured to automatically sense a type of charging cable connected to an electric vehicle charging station and set its maximum amperage output according to the sensed charging cable type according to one embodiment. The charging station 100 is connected to a power source 160 that supplies electricity to the charging station 100 and can be owned or operated by a local utility company or owned or operated by a private person/company. The charging station 100 includes the control electronics 120 which, among other things, are configured to cause contactors to open and close to deliver power to an electric vehicle. The control electronics 120 also is configured to signal the maximum available continuous current capacity of the charging station 100. For example, the control electronics 120 may include circuitry for sourcing a control pilot signal that may be used to signal the current capacity to an electric vehicle. In some embodiments, the control electronics 120 is controlled by instructions from the processing system 125.

The charging station 100 includes the charging cable interface 110 that includes the connections for connecting the electric vehicle 150 to the EV charging station 100. Example connections will be described in greater detail later herein. The electric vehicle 150 is illustrated as being connected to the charging station 100 through the charging cable interface 110. The electric vehicle 150 includes the on-board charging system 152 that includes a charger component that supplies the power to the battery 154 and any other equipment required to condition and transfer energy from the constant frequency, constant supply voltage supply network to the direct current, variable voltage battery bus for the purposes of charging the battery 154. In use, a user connects the charging cable 140 to the on-board charging system 152.

The charging station 100 supports multiple charging cable types that are rated at different current levels (e.g., a 16 Amp charging cable and a 32 Amp charging cable). The charging station 100 includes the sensor 115 for identifying a property of the charging cable 140 for use in determining type of the charging cable 140. For example, in some embodiments, the sensor 115 detects the presence or absence of a magnet in the charging cable, which indicates the type of charging cable. As another example, in other embodiments, the sensor 115 projects a light and detects whether the charging cable breaks the light (e.g., one type of charging cable is designed to break the light whereas another type of charging cable is designed to not break the light). As another example, in other embodiments, the sensor 115 reads an RFID tag included in the charging cable that identifies the type of charging cable. As another example, in other embodiments, the sensor 115 reads an identification code printed on the charging cable such as a barcode that identifies the type of charging cable.

The processing system 125 automatically configures one or more charging parameters based on the results of the sensor 115, such as setting the maximum amperage output to not exceed the rating of the determined charging cable type. For instance, in an embodiment where the sensor 115 is detecting the presence of a magnet that is included in a particular type of charging cable (e.g., a 32 Amp charging cable), the processing system 125 takes the results from the sensor 115, determines the type of charging cable and its maximum current capacity, and instructs the control electronics 120 to set the maximum available continuous current capacity to not exceed the maximum current capacity supported by that charging cable. The control electronics 120 may signal a corresponding maximum available continuous current capacity to the electric vehicle 150. In some embodiments if the electric vehicle exceeds the signaled maximum available continuous current capacity, the control electronics 100 cause the contactors to open to stop the energy transfer between the electric vehicle and the charging station.

Figure 2:
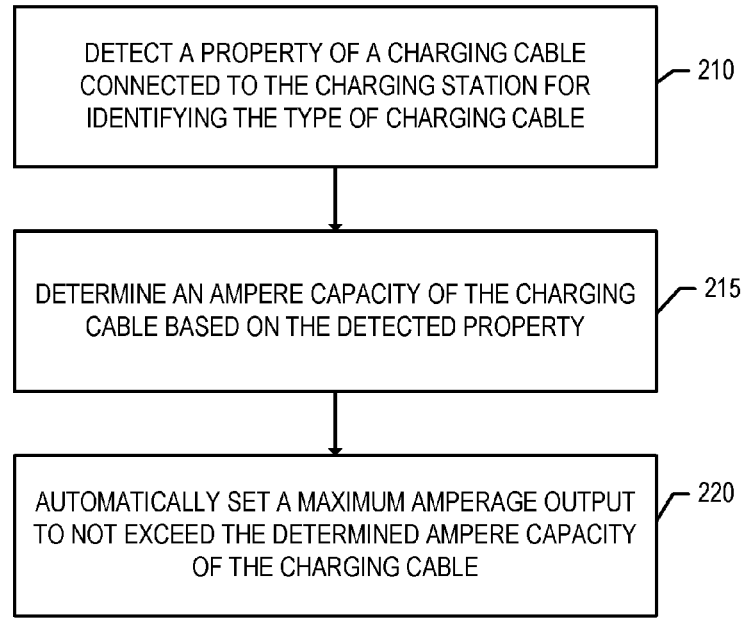
FIG. 2 is a flow diagram that illustrates exemplary operations performed by an electric vehicle charging station for automatically sensing a type of connected charging cable and setting the maximum amperage output of the charging station accordingly, according to one embodiment

FIG. 2 is a flow diagram that illustrates exemplary operations performed by an electric vehicle charging station for automatically sensing a type of connected charging cable and setting the maximum amperage output of the charging station accordingly, according to one embodiment. The operations of FIG. 2 will be described with the exemplary embodiment of FIG. 1, however it should be understood that the operations described with reference to FIG. 2 can be performed by embodiments other than those discussed with reference to FIG. 1, and the embodiments discussed with reference to FIG. 1 can perform operations different than those discussed with reference to FIG. 2.

At operation 210, the charging station 110 detects a property of a charging cable connected to the charging station 110 used for identifying the type the charging cable connected to the charging station. For example, the sensor 115 of the charging station 110 is used to detect a property of the charging cable as previously described herein. Flow then moves to operation 215.

At operation 215, the charging station 110 determines an ampere capacity of the charging cable based on the detected property. For example, in a specific embodiment, the charging station 110 supports two types of charging cables that have different ampere capacities (e.g., one at 16 Amps and one at 32 Amps), and one of those types of charging cables has an observable property different than the other type of charging cable. For instance, one of the charging cable types has a magnet that can be detected while the other type of charging cable does not include such magnet. Based on the results of the detecting, the processing system of the charging station determines the type of charging cable. Flow then moves to operation 220.

At operation 220, the charging station 110 automatically sets the maximum amperage output to not exceed the determined ampere capacity of the charging cable. In one embodiment, this operation includes the processing system 125 causing the control electronics 120 to signal to the electric vehicle (once connected), through Pulse Width Modulation of a control pilot signal, the maximum available continuous current capacity to not exceed the determined ampere capacity of the charging cable.

Figure 3:
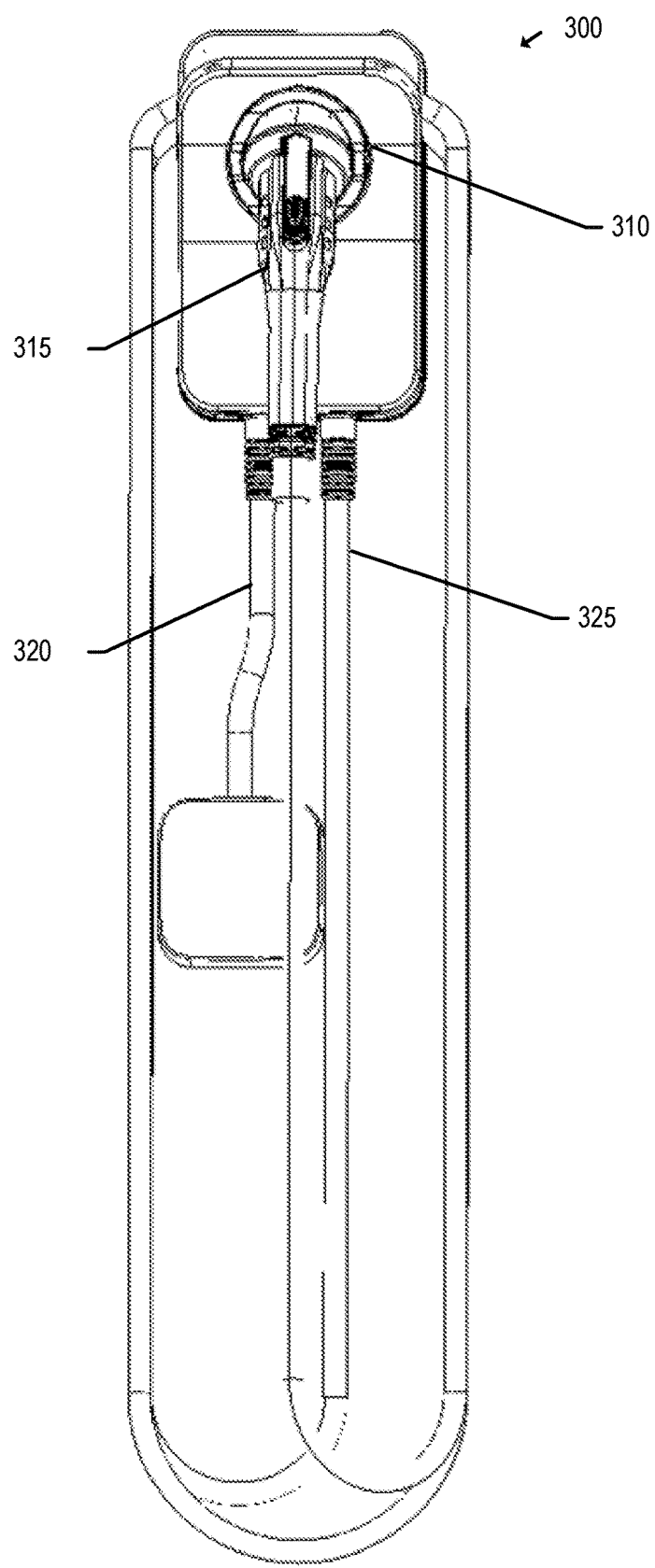
FIG. 3 illustrates a specific embodiment of an electric vehicle charging station 300 that automatically senses the type of charging cable and sets its maximum amperage output accordingly.

FIG. 3 illustrates a specific embodiment of an electric vehicle charging station 300 that automatically senses the type of charging cable and sets its maximum amperage output accordingly. The power cable 320 connects the charging station 300 to a power source. As illustrated in FIG. 1 the charging station 300 is designed to be plugged into a socket, however embodiments of the invention are applicable to charging stations that connect to a power source differently (e.g., hard-wired directly to the electrical supply). The charging cable 325 connects the charging station 300 to an electric vehicle. The charging cable 325 includes a charging coupler 315 that is designed to be plugged into on-board electronics of an electric vehicle. The charging coupler 315 can be a standard coupler such as one conforming to the Society of Automotive Engineers (SAE) J1772 or can be a nonstandard coupler. FIG. 1 illustrates the charging coupler 315 inserted into a holster 310 of the charging station 300 that holds the charging coupler 315 when not in use. In use, a user removes the charging coupler 315 from the holster 310 and connects the charging coupler 315 to their electric vehicle. While a holster 310 is illustrated that holds the charging coupler 315 when not in use, embodiments of the invention are applicable to charging stations that do not include a holster or other ways of holding the charging coupler when not in use.

Figure 4:
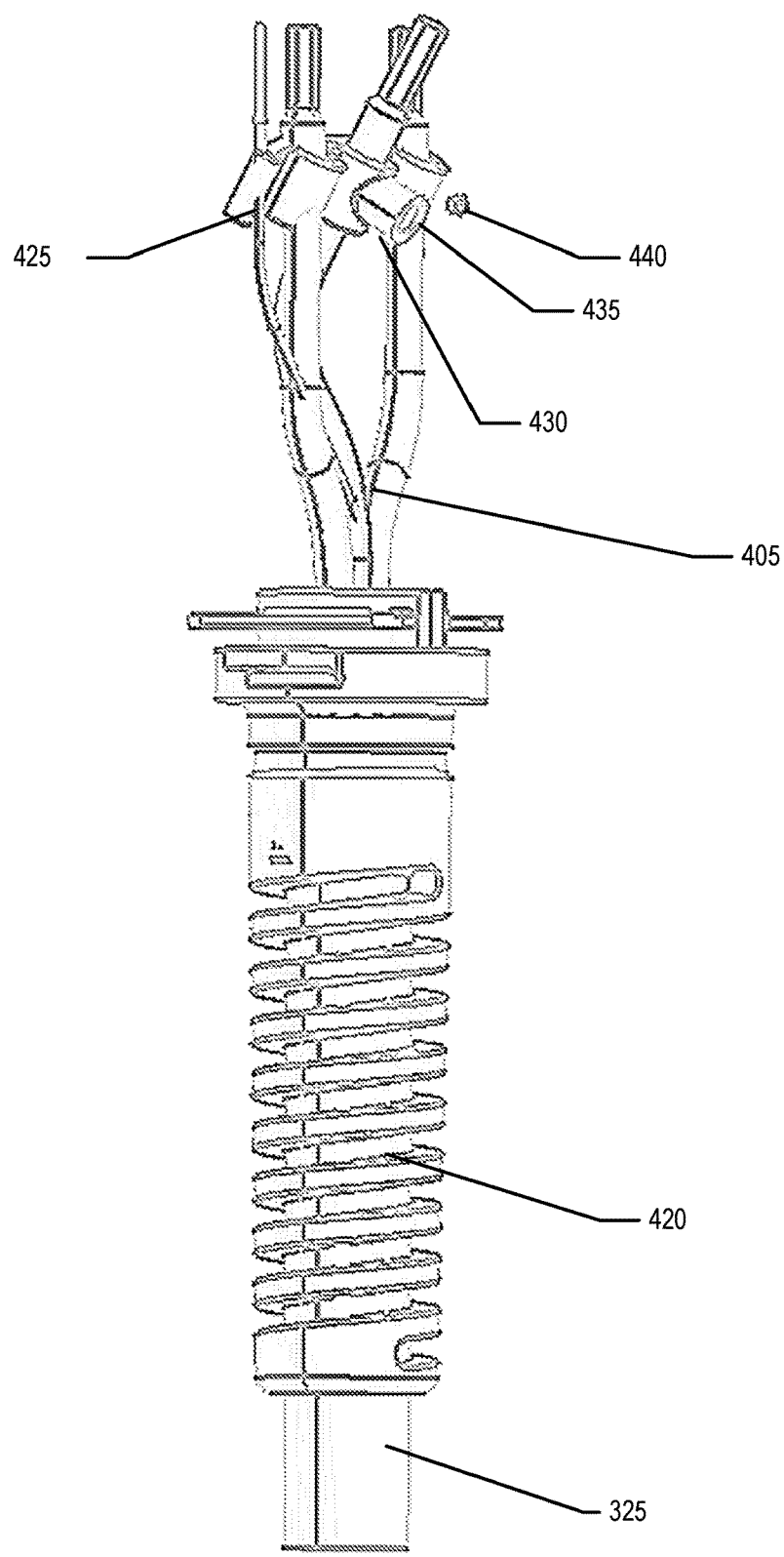
FIG. 4 illustrates the end of the charging cable illustrated in FIG. 3 opposite from the charging coupler according to one embodiment.

The charging cable 325 connects to the charging station 300 at the opposite end from the charging coupler 315. FIG. 4 illustrates the end of the charging cable 325 opposite from the charging coupler 315 according to one embodiment. The charging cable 325 passes through the strain relief 420 that constrains the charging cable 325 to a minimum bend radius to, among other things, protect the charging cable 325 from damage due to a pull force. The strain relief is optional in some embodiments. The charging cable 325 includes the charging wires 405. In one embodiment, the charging wires 405 include one or more wires for power, a ground wire, and a wire for signaling (e.g., a wire carrying a control pilot signal). In some embodiments, the charging station 300 includes control pilot circuitry (not illustrated) that processes control pilot signals. The control pilot allows charging stations to ensure proper operation when charging electric vehicles. In one embodiment, the control pilot signal is used to signal the maximum available continuous current capacity, which as will be described in greater detail later herein, is based on the detection of the type of charging cable.

Figure 5:
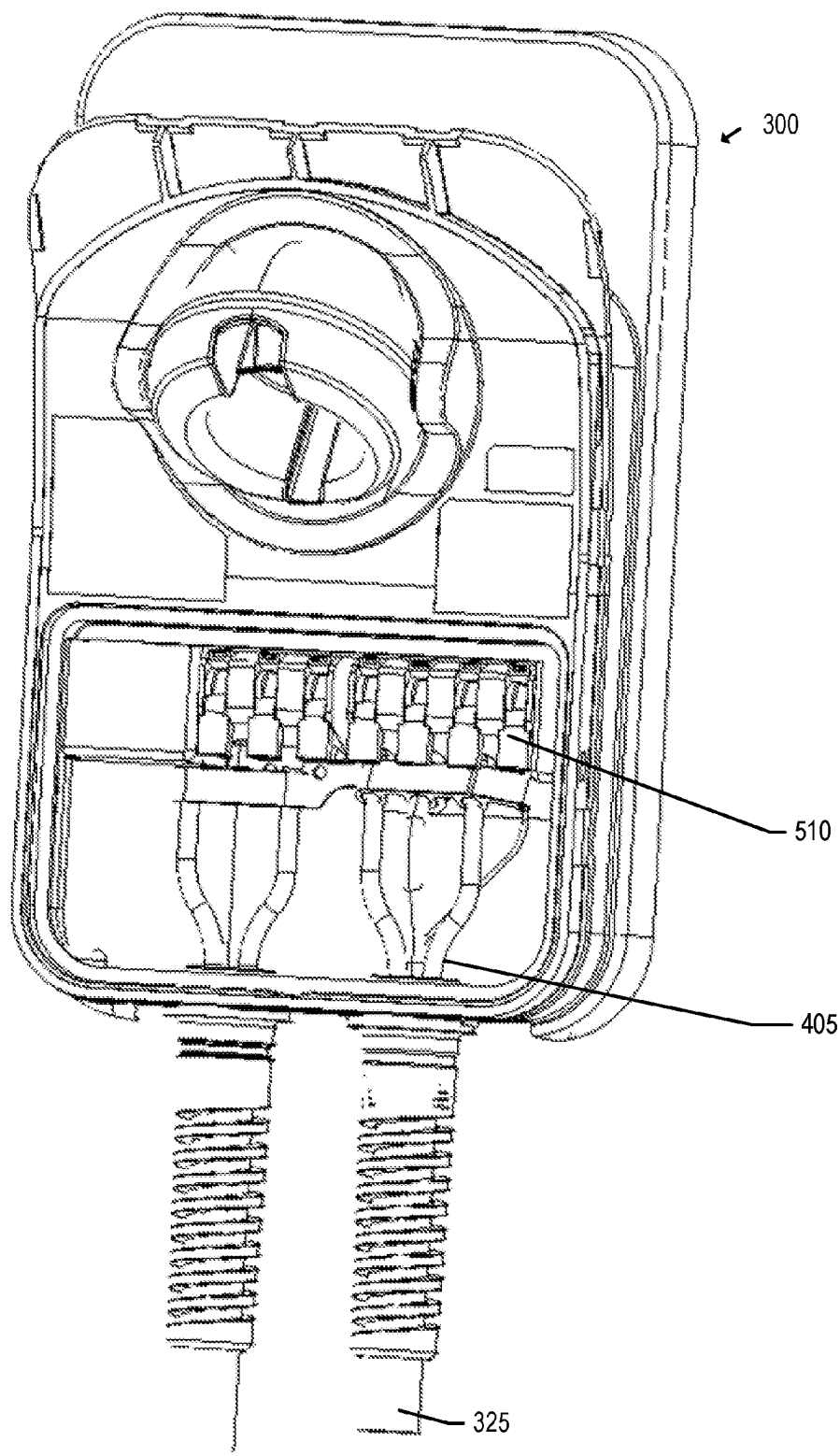
FIG. 5 illustrates a detailed view of the charging station illustrated in FIG. 3 without the front cover.

The charging cable 325 and charging station 300 are designed so that the charging cable 325 can be removable from the charging station 300. This allows, for instance, users to bring and use their own charging cables when charging their electric vehicle. In one embodiment, the charging station 300 includes quick disconnect connectors that allow the charging wires 405 to be quickly and easily connected and disconnected (e.g., with a minimal amount of force). The charging cable 325 includes the overmold brace 425 in which the charging wires 405 pass through which helps guide the wires to the quick disconnect connectors. FIG. 5 illustrates a detailed view of the charging station 300 without the front cover that shows the charging cables 405 connected to the charging station 300 through the quick disconnect connectors 510.

Figure 6:
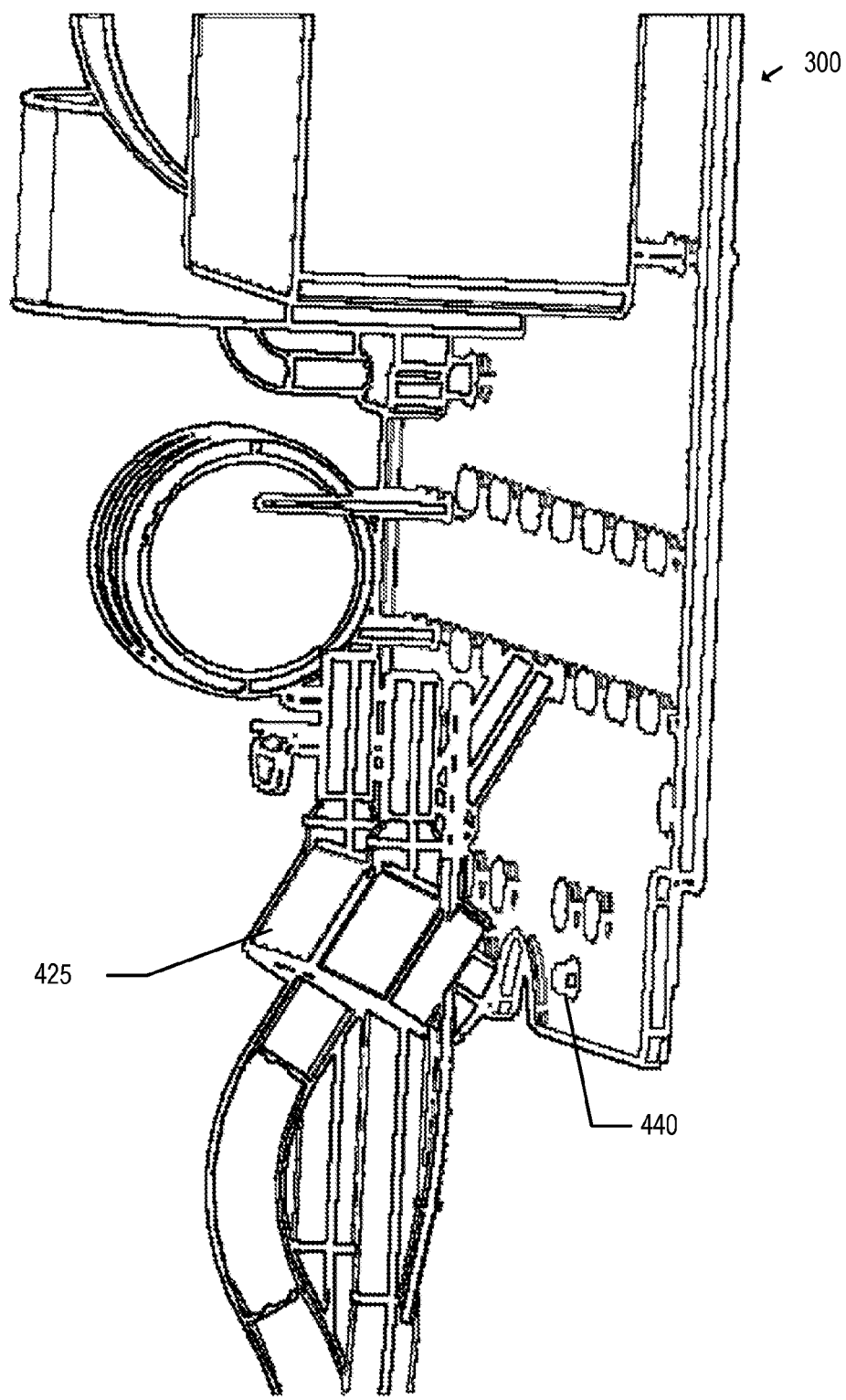
FIG. 6 illustrates another view that shows the sensor illustrated in FIG. 4.

The charging station 300 supports different types of charging cables. In the specific embodiment of the charging station 300, the charging station supports charging cables that are rated at two different current levels (e.g., cables at 16 Amps and cables at 32 Amps). The charging station 300 determines the type of charging cable that is connected based on an observable physical property of the charging cable. For instance, the overmold brace 425 includes a magnet holder 430 that is designed to hold a magnet 435, where a magnet is installed in only one of the two types of charging cables. The charging station 300 detects the presence or absence of the magnet which determines the type of charging cable. For example, the charging station includes the sensor 440 (e.g., a hall effect sensor) that detects whether a magnet is included in the charging cable 405. FIG. 6 illustrates another view that shows the sensor 440 in relation to the magnet holder 430. The charging station 300 may signal the continuous current capacity to not exceed the rating of the determined charging cable. For instance, assuming that the charging station 300 determined that a charging cable that is rated at 16 Amps is connected, the charging station 300 automatically sets the maximum available continuous current capacity to not exceed 16 Amps and signals (e.g., through modulation of the control pilot signal) the maximum available continuous current capacity to an electric vehicle when the vehicle is connected.

Figure 7:
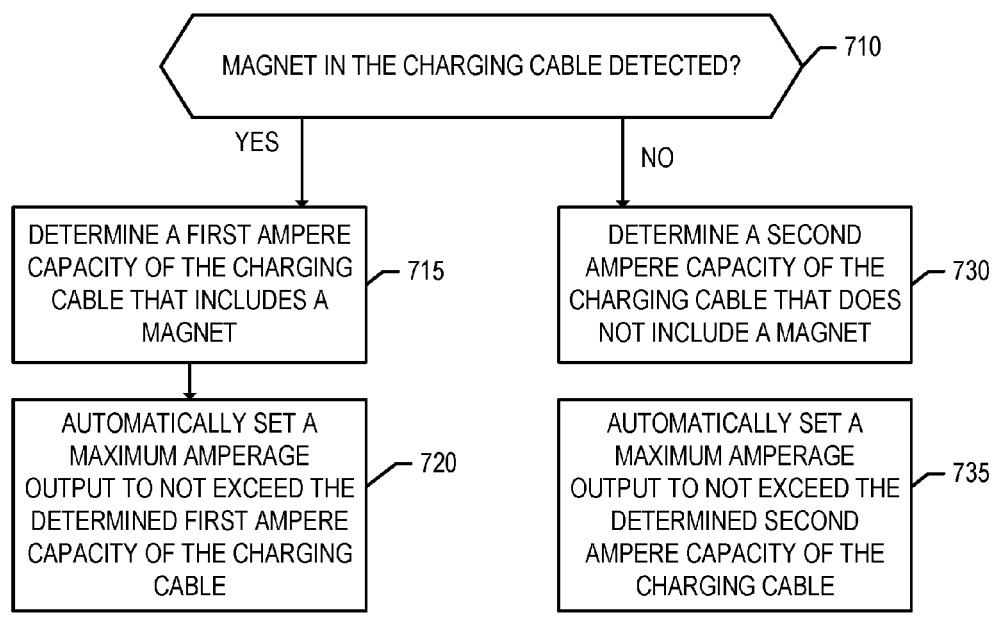
FIG. 7 is a flow diagram that illustrates exemplary operations performed by the electric vehicle charging station illustrated in FIG. 3 for automatically sensing a type of connected charging cable and setting the maximum amperage output of the charging station accordingly, according to one embodiment.

FIG. 7 is a flow diagram that illustrates exemplary operations performed by an electric vehicle charging station for automatically sensing a type of connected charging cable and setting the maximum amperage output of the charging station accordingly, according to one embodiment. The operations of FIG. 7 will be described with the exemplary embodiment of FIGS. 3-6, however it should be understood that the operations described with reference to FIG. 7 can be performed by embodiments other than those discussed with reference to FIGS. 3-6, and the embodiments discussed with reference to FIGS. 3-6 can perform operations different than those discussed with reference to FIG. 7.

At operation 7, the charging station 300 determines whether a magnet is included in the charging cable 325. For example, the sensor 440 (e.g., a hall effect sensor) is used to determine whether a magnet is included in the magnet holder 430. If a magnet has been detected, then flow moves to operation 715. If a magnet has not been detected, then flow moves to operation 730. At operation 715, the charging station 300 determines a first ampere capacity of the charging cable based on the detection of the magnet. For example, the charging cables that include a magnet may have an ampere capacity of 32 Amps while the charging cables that do not include a magnet may have a lower ampere capacity of 16 Amps. Flow moves from operation 715 to operation 720, where the charging station 300 automatically sets its maximum amperage output to not exceed the first ampere capacity. For example, the charging station 300 may signal to the electric vehicle (once connected), through PWM of a control pilot signal, the maximum available continuous current capacity to not exceed the determined first ampere capacity of the charging cable. Referring back to operation 730, the charging station 300 determines a second ampere capacity of the charging cable based on the result of not detecting the magnet. The second ampere capacity may be lower than the first ampere capacity. Flow then moves to operation 735 where the charging station 300 automatically sets its maximum amperage output to not exceed the second ampere capacity.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in an electric vehicle charging station, comprising:
    detecting, by the electric vehicle charging station, a property of a charging cable connected to the electric vehicle charging station, wherein the detecting includes the electric vehicle charging station detecting whether a magnet is included in the charging cable, wherein the magnet when included in the charging cable is located within a portion of the charging cable that is within a housing of the electric vehicle charging station;
    determining, by the electric vehicle charging station, an ampere capacity of the charging cable based on the detected property, wherein determining the ampere capacity of the charging cable is based on whether the magnet was detected in the charging cable; and
    automatically setting, by the electric vehicle charging station, a maximum amperage output of the electric vehicle charging station to not exceed the determined ampere capacity of the charging cable.

2. The method of claim 1, wherein automatically setting the maximum amperage output of the electric vehicle charging station includes signaling a maximum available continuous current capacity that does not exceed the determined ampere capacity of the charging cable to an electric vehicle connected to the electric vehicle charging station via the charging cable.

3. The method of claim 2, wherein signaling the maximum available continuous current capacity is performed through pulse width modulation of a control pilot signal.

4. An electric vehicle charging station, comprising:
    a sensor configured to detect whether a magnet is included in a predefined location in a charging cable connected to the electric vehicle charging station, wherein the predefined location in the charging cable is located within a portion of the charging cable that is within a housing of the electric vehicle charging station;
    a processing system coupled with the sensor and configured to determine an ampere capacity of the charging cable based on whether the sensor detected the magnet in the predefined location in the charging cable; and
    control electronics coupled with the processing system to automatically set a maximum amperage output of the electric vehicle charging station to not exceed the determined ampere capacity of the charging cable.

5. The electric vehicle charging system of claim 4, wherein the sensor is a hall effect sensor.

6. The electric vehicle charging system of claim 4, wherein the automatically setting of the maximum amperage output of the electric vehicle charging station includes the control electronics to signal a maximum available continuous current capacity that does not exceed the determined ampere capacity of the charging cable to an electric vehicle connected to the electric vehicle charging station via the charging cable.

7. The electric vehicle charging system of claim 6, wherein the control electronics is to signal the maximum available continuous current capacity through pulse width modulation of a control pilot signal.

8. A method in an electric vehicle charging station, comprising:
    detecting, by the electric vehicle charging station, that a magnet is included in a first charging cable connected to the electric vehicle charging station, wherein the magnet is included in the first charging cable in a portion of the first charging cable that is within a housing of the electric vehicle charging station;
    responsive to the detecting that the magnet is included in the first charging cable, determining, by the electric vehicle charging station, a first ampere capacity of the first charging cable;
    automatically setting, by the electric vehicle charging station, a maximum amperage output to not exceed the determined first ampere capacity of the first charging cable;
    detecting, by the electric vehicle charging station, that a magnet is not included in a second charging cable connected to the electric vehicle charging station;
    responsive to the detecting that the magnet is not included in the second charging cable, determining, by the electric vehicle charging station, a second ampere capacity of the second charging cable; and
    automatically setting, by the electric vehicle charging station, a maximum amperage output to not exceed the determined second ampere capacity of the second charging cable.

9. The method of claim 8, wherein the detecting that the magnet is included in the first charging cable is by a hall effect sensor included in the electric vehicle charging station.

10. The method of claim 8, wherein automatically setting the maximum amperage output of the electric vehicle charging station to not exceed the determined first ampere capacity of the first charging cable includes signaling a first maximum available continuous current capacity that does not exceed the determined first ampere capacity of the first charging cable to a first electric vehicle connected to the electric vehicle charging station via the first charging cable, and wherein automatically setting the maximum amperage output of the electric vehicle charging station to not exceed the determined second ampere capacity of the second charging cable includes signaling a second maximum available continuous current capacity that does not exceed the determined second ampere capacity of the second charging cable to a second electric vehicle connected to the electric vehicle charging station via the second charging cable.

11. The method of claim 10, wherein signaling the first maximum available continuous current capacity and signaling the second maximum available continuous current capacity is performed through pulse width modulation of a control pilot signal.

12. The method of claim 8, wherein the first ampere capacity is greater than the second ampere capacity.

13. The method of claim 12, wherein the first ampere capacity is 32 Amps and the second ampere capacity is 16 Amps.

* * * * *